(12) United States Patent
Bueno Peña et al.

(10) Patent No.: US 12,355,387 B2
(45) Date of Patent: Jul. 8, 2025

(54) INTER-HARMONIC DAMPING SYSTEM AND METHOD

(71) Applicant: Siemens Gamesa Renewable Energy Innovation & Technology S.L., Sarriguren (ES)

(72) Inventors: Emilio José Bueno Peña, Alcalá de Henares (ES); Emilio David Rebollo López, Madrid (ES); Elena Sáiz Marín, Madrid (ES); Francisco Granado Rosa, Sarriguren (ES)

(73) Assignee: Siemens Gamesa Renewable Energy Innovation & Technology S.L., Sarriguren (ES)

( * ) Notice: Subject to any disclaimer, the term of this patent is extended or adjusted under 35 U.S.C. 154(b) by 0 days.

(21) Appl. No.: 18/287,039

(22) PCT Filed: Apr. 7, 2022

(86) PCT No.: PCT/EP2022/059326
§ 371 (c)(1),
(2) Date: Oct. 16, 2023

(87) PCT Pub. No.: WO2022/223311
PCT Pub. Date: Oct. 27, 2022

(65) Prior Publication Data
US 2024/0235444 A1     Jul. 11, 2024

(30) Foreign Application Priority Data
Apr. 19, 2021   (EP) ..................................... 21382336

(51) Int. Cl.
H02P 9/10      (2006.01)
H02P 9/04      (2006.01)
H02P 101/15    (2016.01)

(52) U.S. Cl.
CPC ................ H02P 9/105 (2013.01); H02P 9/04 (2013.01); *H02P 2101/15* (2015.01)

(58) Field of Classification Search
CPC ......... H02P 9/105; H02P 9/04; H02P 2101/15
See application file for complete search history.

(56) References Cited

U.S. PATENT DOCUMENTS

2019/0140571 A1*   5/2019   Freire ..................... H02J 3/381

FOREIGN PATENT DOCUMENTS

CN          112 103 970 A      12/2020

OTHER PUBLICATIONS

Pang Bo et al: "Improved Operation of DFIG System under Harmonically Distorted Grid Considering Interharmonics", 2019 IEEE Applied Power Electronics Conference and Exposition (APEC), IEEE, Mar. 17, 2019 (Mar. 17, 2019).
(Continued)

*Primary Examiner* — Viet P Nguyen
(74) *Attorney, Agent, or Firm* — Schmeiser, Olsen & Watts, LLP (57) ABSTRACT

A wind turbine is provided. The wind turbine includes an electric generator, a converter and a control system. The electric generator includes a rotor configured to rotate at different rotation speeds thereby operating at different operation points, and a converter having a rotor side converter and a power consumption system, i.e., grid-side, side converter. The control system includes a current control loop and an inter-harmonic damping control unit arranged in parallel to the current control loop. The inter-harmonic damping control unit damping control unit comprises at least a resonant controller which is dependent on the operation point for tracking and damping the one or more inter harmonic(s) of the wind turbine. A method for damping inter-harmonics is also provided.

14 Claims, 5 Drawing Sheets

(56) References Cited

OTHER PUBLICATIONS

Golestan Saeed et al: "Single-Phase Frequency-Locked Loops: A Comprehensive Review", IEEE Transactions on Power Electronics, Institute of Electrical and Electronics Engineers, USA, vol. 34, No. 12, Dec. 1, 2019 (Dec. 1, 2019).
International Search Report & Written Opinion for PCT/EP2022/059326, mailed on Jul. 15, 2022.
Guest et al., Mitigation of Harmonic Voltage Amplification in Offshore Wind Power Plants by Wind Turbines with Embedded Active Filters; 2018, 10 pages, Citation information: DOI 10.1109/TSTE.2019.2906797, IEEE.
Yao et al; Analytical Model for DFIG Stator Interharmonic Current Induced by RSC Disturbance Voltage through Stator and Rotor Flux; 2017 4th International Conference on Electrical and Electronics Engineering; pp. 6-12, 2017.
Li et al., Interharmonics: basic concepts and techniques for their detection and measurement; 2003, Elsevier, 10 pages, Electric Power Systems Research 66 (2003) 39-48.
Javier Moriano Martin; Contributions to the multifrequency control of grid-tied voltage source converters; Thesis, 2018, 210 pages.

\* cited by examiner

INTER-HARMONIC DAMPING SYSTEM AND METHOD

CROSS-REFERENCE TO RELATED APPLICATIONS

This application claims priority to PCT Application No. PCT/EP2022/059326, having a filing date of Apr. 7, 2022, which claims priority to EP Application No. 21382336.2, having a filing date of Apr. 19, 2021, the entire contents both of which are hereby incorporated by reference.

FIELD OF TECHNOLOGY

The following relates to a wind turbine control system and to a method for damping inter-harmonics of a wind turbine.

BACKGROUND

The increasing use of power electronic devices in the generation and distribution of electrical energy in recent years has led to an increase in current and voltage harmonics content within the electrical grid. As a result, the Transmission System Operators (TSOs) have tightened the requirements regarding the maximum levels of harmonics. In addition, in some countries e.g., Egypt, the maximum levels of inter-harmonics have also been strongly restricted.

Inter-harmonics are non-integer multiples of the fundamental frequency that may appear in an electric power generating system such as a wind turbine as consequence of the generator structure. When trying to mitigate such inter-harmonics, it is known to add a specific damping hardware. However, this hardware addition involves structural problems, and it is usually costly and complex to install.

The use of damping control systems such as resonant controllers to tackle harmonic suppression is known, see for example J. Moriano, PhD: Contributions to the Multifrequency Control of Grid-Tied Voltage Source Converter, 2018. However, current damping systems are not efficient when damping inter-harmonics.

In conclusion, the goal would be providing new control strategies and/or systems for damping inter-harmonics in a reliable, retro-compatible and cost-effective way.

Technical publication entitled: "Improved Operation of DFIG System under Harmonically Distorted Grid Considering Interharmonics", by PANG BO ET AL, in IEEE APPLIED POWER ELECTRONICS CONFERENCE AND EXPOSITION (APEC), IEEE, 17 Mar. 2019 (2019 May 17), pages 1102-1108, XP033556053, proposes an improved control strategy for the operation of doubly fed induction generator (DFIG) system under harmonically distorted grid with, the consideration of inter-harmonics.

Technical publication entitled: "Single-Phase Frequency-Locked Loops: A Comprehensive Review", by GOLESTAN SAEED ET AL: in IEEE TRANSACTIONS ON POWER ELECTRONICS, INSTITUTE OF ELECTRICAL AND ELECTRONICS ENGINEERS, USA, vol. 34, no. 12, 1 Dec. 2019 (2019 Dec. 1), pages 11791-11812, XP011745396, relates to an open-loop and closed-loop synchronization methods for energy applications.

Chinese patent application CN 112103970A relates to an inter-harmonic oscillation suppression method and device for a grid-connected converter.

SUMMARY

The inter-harmonics are non-integer multiples of the fundamental frequency, which appear at an electric generator. Contrary to harmonics, each inter-harmonic comprises two components: a direct component and an inverse component.

Depending on the reference frame in which the control system is implemented, such components may be symmetric, e.g., to the fundamental frequency, or not. Furthermore, as a result of a translation from a stationary reference to a synchronous one, or vice versa, the order of inter-harmonic(s) is shifted, i.e., the components are shifted, thereby losing the symmetry. That is, as the reference may be placed at fundamental frequency, the components, i.e., both the direct and the inverse components; are shifted according to the following formula:

$$s = \pm h - 1$$

wherein s is the inter-harmonic order in synchronous reference frame and h is the inter-harmonic order in stationary reference to be damped.

In stationary reference frame, i.e., $\alpha\beta$ reference frame, the inter-harmonic A would have $\pm A$ components; while in synchronous reference frame, i.e., dq reference frame, the same inter-harmonic would have $-A1$ and $+A2$ components. For example, the components of the inter-harmonic 12.5, i.e., h=12.5: would be $\pm 12.5$ in the stationary frame $\alpha\beta$, and $-11.5$ and $+13.5$ in synchronous reference frame dq.

Inter-harmonics may be generated due to the design of the electric generator. Inter-harmonics may also depend on the operational point of the generator i.e., on the rotational speed of the rotor. That is, contrary to harmonics, which have fixed values, upon a change in the operational point e.g., due to a variation of the speed of the rotor: the inter-harmonics order or components are moved accordingly. Indeed, the inter harmonics existing in the rotor, in $\alpha\beta$ stationary reference frame are highly dependent on the rotor speed and/or the slip.

In an example, for an exemplary rotor speed of 1680 rpm, the inter-harmonic components may be at 622 Hz and at 722 Hz, or when dividing by the fundamental frequency of the grid, e.g. 50 Hz, the inter-harmonic direct component and indirect component may be 12.5 and 14.5, respectively (or $12.5^{th}$ and $14.5^{th}$, respectively).

The number and location of inter-harmonics in an electric generating system, e.g., a wind turbine, may be determined by the following equation:

$$f_{SH} = 6n \cdot (1-s) \cdot f_0 \pm f_0$$

Wherein fSH in the frequency of the inter-harmonic, n is an integer indicating the number of air-gap field pairs of poles, f0 is the fundamental grid frequency and s is the slip that may be calculated with the following formula:

$$s = \frac{N_{sync} - N}{N_{sync}}$$

Wherein N is rotational speed and Nsync is synchronous rotational speed. The inter harmonic order h may be calculated dividing the inter-harmonic frequency fSH by the fundamental frequency f0.

In a first aspect, wind turbine is provided. The wind turbine comprises an electric generator, a converter and a control system. The electric generator comprises a rotor configured to rotate at different rotation speeds thereby operating at different operation points, and a converter having a rotor side converter and a power consumption system, i.e., grid-side, side converter. The control system comprises a current control loop and an inter-harmonic damping control unit arranged in parallel to the current control loop. The inter-harmonic damping control unit damping control unit comprises at least a resonant controller which is dependent on the operation point for tracking and damping the one or more inter harmonic(s) of the wind turbine, i.e., of the generator of the wind turbine.

The use of an inter-harmonic control system which is dependent on the operational point enables an effective damping of inter-harmonics, as inter-harmonics are dependent on the operation point and move along a horizontal axis according to its variations. Such an inter-harmonic control system is therefore made adaptative, that is, it may adapt its performance according to the operation point to track and determine the location of the inter-harmonics to be damped. An effective inter-harmonic damping system may thus be obtained for any operational scenario as it may be dynamically adapted to the changing operation conditions.

In addition, as the inter-harmonic damping structure is to be arranged in parallel to the current control loop 110, the control system may retro-compatible, that is, it may be compatible with previous control structure thereby saving both time and costs as there may no need to replace previous or pre-existing control system, and also facilitating its implementation.

Furthermore, such control system enables complying with the grid code requirements as enables effective damping the inter-harmonic(s) whichever the operation point is.

In an example, the inter-harmonic damping control unit may comprise a plurality of resonant controllers arranged in parallel thereby improving the number of inter-harmonics to be managed by the control system.

Resonant controllers provide infinite gain at a desired or target frequency, in other words, they may provide a very specific and narrow filter which effectively damps a predefined frequency. Several resonant controllers are known, for instance, Second Order Generalized Integrator (SOGI)-filter based and Reduced Order Generalized Integrator (ROGI)-filter based controllers. SOGI-filter based controllers affect equally the dynamics of the direct and inverse components while ROGI-filter based controllers affect each component dynamics in a different way. ROGI filter-based controller may obtain an infinite gain in a single frequency. The following equations describe the transfer functions (Y(s)/X(s)) of SOGI- and ROGI-filter based controllers respectively:

$$\frac{Y_{SOGI}(s)}{X_{SOGI}(s)} = \frac{ks}{s^2 + h \cdot \omega_0^2};$$

$$\frac{Y_{ROGI}(s)}{X_{ROGI}(s)} = \frac{k}{s \pm jh \cdot \omega_0};$$

Wherein k is the gain, s is the slip, h is the inter-harmonic order and wo is the rotational speed of the rotor.

The use of already existing harmonic damping controllers but configured, i.e., made adaptative, to damp inter-harmonics allows saving costs no new and special hardware is required to tackle the inter-harmonic damping.

In an example, the number of resonant controllers may depend on the reference frame, i.e. an abstract coordinate system such as stationary frame αβ or synchronous reference frame dq; and may be proportional to the number of inter-harmonics to be damped, a more versatile control system may thus be obtained as it may be adapted and/or be implemented according to the requirements of each case.

In an example, the number of resonant controllers may be equal to the number of inter-harmonics to be damped thereby decreasing the number of required resonant controller(s) as a single resonant controller may be configured to deal with, i.e., to damp, an inter-harmonic. In an example, the resonant controller(s) may be a SOGI-filter based controller(s).

For example, in case the wind turbine, i.e., the generator, has two inter-harmonics and the control system is implemented in stationary frame αβ, two resonant controllers may be used wherein such resonant controllers may be SOGI-filter based controllers. In such examples, a single SOGI-filter based configured to damp both components i.e., direct and inverse components, of each inter-harmonic may suffice.

In an example, the number of resonant controllers may be twice the number of inter-harmonics to be damped. By using twice, the number of inter-harmonics, the direct component and the indirect component of each inter-harmonic may be independently affected e.g., in synchronous dq reference frame wherein the components of an inter-harmonic are not symmetric with respect to the fundamental frequency.

In an example, the at least one resonant controller may be a SOGI-filter based controller which enables reducing the number of controllers. Indeed, each SOGI-filter based controller is able to handle, i.e., to damp, both components of each inter-harmonic e.g., in stationary αβ reference frame, a single SOGI per inter-harmonic may suffice. The implementation complexity and cost may thus be reduced.

In an example, the plurality of resonant controllers may be ROGI-filter based controllers, SOGI-filter based controllers or a combination thereof. The control system is thus more versatile as different types of resonant controllers may be arranged within the same structure. As a result, each inter-harmonic component, i.e., the direct or the inverse component, may be affected differently. Therefore, the system enables damping and/or affecting each inter-harmonic component independently e.g., with different dynamic.

In an example, the at least one resonant controller may be implemented at the power consumption system side converter thereby a more efficient control strategy may be implemented as it is directly coupled to the power consumption system e.g., a grid. In an example, the at least one resonant controller may be implemented at rotor side converter (RSC).

In an example, the inter-harmonic control may comprise at least a resonant controller implemented at the power consumption system side converter and at least a resonant controller implemented at the rotor side converter (RSC) thereby allowing implementing a control system with further flexibility.

For instance, in some cases where wind turbine comprises a Doubly-Fed Induction Generator (DFIG) and an AC/DC-DC/AC converter, the introduction of resonant controller(s) in one side of the converter may cause oscillations to arise in the DC link. In such cases the control system may be implemented at both sides of the converter which enhances the protection of the wind turbine. Therefore, the wind turbine comprises improved efficiency, longer lifetime and better-quality energy production.

In an example, the electric generator may be a Doubly-Fed Induction Generator (DFIG).

In an example, the wind turbine is a DFIG wind turbine. In another example, the wind turbine is a Full Converter wind turbine.

In a further aspect, a method for damping the inter-harmonic(s) of a wind turbine according to any of the disclosed examples, is provided. In embodiments, the method comprises determining the operation point of the wind turbine by measuring the rotational speed of the rotor, and adapting the inter-harmonic damping control unit to the operation point and damping the inter-harmonics of the wind turbine by the inter-harmonic damping control unit.

In embodiments, the method enables effectively damping the inter harmonic(s) present in a wind turbine, i.e., in the generator of the wind turbine. By measuring the operation point and having an inter-harmonic control dependent on such operation point, the inter-harmonics may be tracked and/or determined for the on-going operating conditions. As a result, the inter-harmonic(s) may be effectively damped and the grid requirements whichever the operation point is.

In an example, adapting the inter-harmonic damping control unit to the operation point may comprise iteratively increasing the gain (K) of the transfer function of the inter-harmonic damping control unit, starting from a minimum gain and by adding a predefined increase (Δh), until the Total Harmonic Current Distortion (THDc) is complied. An online control may thus be implemented.

In an example, adapting the inter-harmonic damping control unit to the operation point may comprise comparing the measured rotor speed with a plurality of predefined rotor speed value ranges of a pre-stablished gain schedule, wherein each predefined rotor speed value range comprises associated inter-harmonic related coefficients; and replacing the inter-harmonic related coefficients of the predefined rotor speed value range within which the measured rotor speed falls in the transfer function of the inter-harmonic damping control.

By making the control adaptative in this way avoids introducing disturbances in other controllers of the system, thus, the introduction of the inter-harmonic damping control unit does not alter the functioning of a pre-existing control structure.

BRIEF DESCRIPTION

Some of the embodiments will be described in detail, with reference to the following figures, wherein like designations denote like members, wherein.

DETAILED DESCRIPTION

The term "inter-harmonic" shall be understood as a non-integer harmonic of the fundamental frequency. Each inter-harmonic comprises a direct component and an inverse component. The term "inter-harmonic" shall be understood as comprising both inter-harmonic components. The terms "inter-harmonic" and "inter-harmonic component(s) are herein interchangeably used".

The term "direct component of an inter-harmonic" shall be understood as the component located in the positive axis of a reference frame.

The term "inverse component of an inter-harmonic" shall be understood as the component located in the negative axis of a reference frame.

The term "operation point" shall be understood as the on-going working/operating state of a device, e.g., a wind turbine, at a predetermined speed, such state being dependent on the rotatory speed of the rotor. The terms "operating point" or "point of operation" shall be regarded as synonyms and are interchangeably used herein.

The term "angular rotor speed", "rotatory speed of the rotor", "rotational speed of the rotor" and "rotor speed" are indistinctively and interchangeably used herein.

The term "parallel to the current control loop" shall be understood as a device arranged to receive the same input as the current control loop, e.g. the contribution of the reference current $i^*\_\alpha\beta$, $i^*\_dq$ and the measured current $i\_\alpha\beta$, $i\_dq$; and also arranged to enable a contribution between the current control loop output and its own output i.e. the output of a single module or the contribution of each module output in case a plurality of modules is used.

The term "damping" shall be understood reducing the amplitude of a certain predetermined frequency. Usually, a frequency component having the opposite value of the frequency to be damped is generated. thereby counterbalancing the predetermined frequency i.e., the sum of both values would be around 0.

The term "Total Harmonic Current Distortion (THDc)" shall be understood as a measurement of the harmonic distortion present in a system which is defined as the ratio of the sum of the power of all harmonic current components to the power of the fundamental frequency current. It is usually imposed by the grid operators as part of the grid requirements in each country/region.

The term "Proportional Integer (PI) controller" shall be understood as a control wherein only the proportional and integral terms are used. The terms Proportional Integer control and Proportional Integral control are interchangeably used herein.

Figure 1:
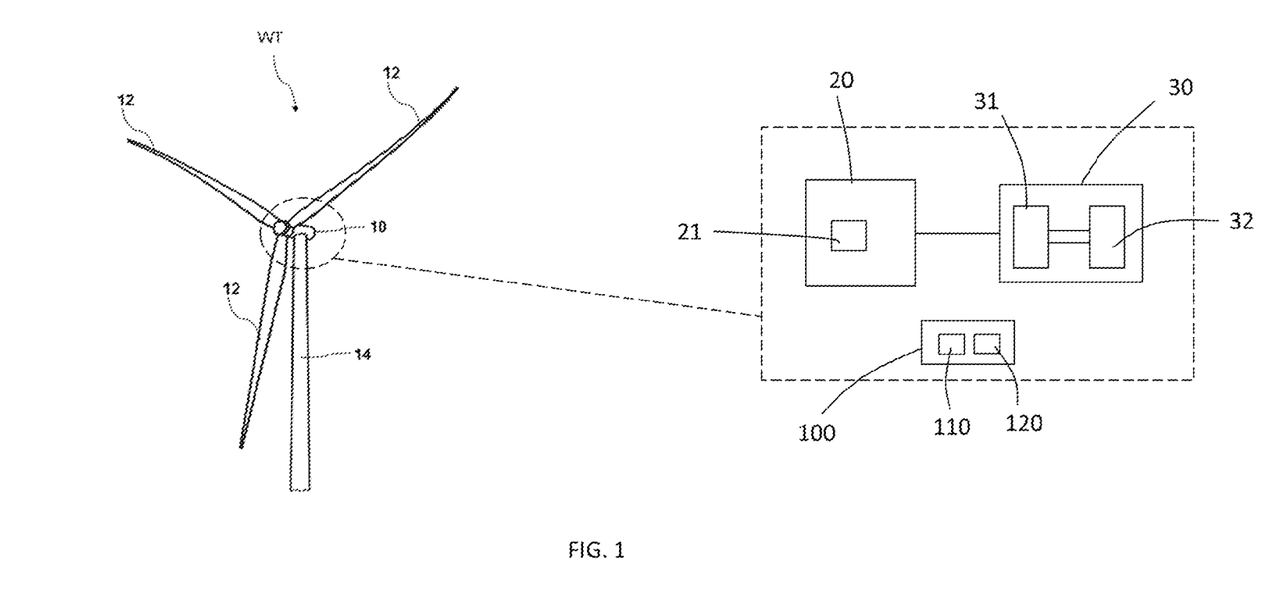
FIG. 1 schematically illustrates a wind turbine according to an example.

FIG. 1 illustrates an exemplary wind turbine WT according to an example.

The wind turbine WT of FIG. 1 may comprise a nacelle 10 which may house a power generator 20. The nacelle 10 may be mounted on tower 14. FIG. 1 discloses a portion of the tower 14, however, the tower 14 may have any height that facilitates the operation of a wind turbine WT according to any of the examples herein disclosed, such height may depend e.g. on the specific site requirements.

The wind turbine WT may also comprise a rotor hub connected to a plurality, e.g., three, blades 12 extending radially outwardly from the hub for converting the wind energy into rotational energy. The wind turbine WT may have any other number of blades 12 that facilitates operation of the wind turbine WT. The blades may have any length and/or shape.

The power generator 20 e.g., a Doubly Fed Induction Generator (DFIG) or a Full Converter (FC) generator, may comprise a rotor 21 configured to rotate at different rotation speeds thereby operating at different operation points. The generator 20 may be coupled to a power converter 30, or to a power converter system, that may convert a substantially Direct Current (DC) power output from the power generator to Alternating Current (AC) power. The AC power may be transmitted or injected into an electrical distribution network, i.e., a grid. The converter may comprise a Rotor Side Converter 31 and a Grid Side Converter or power consumption system side converter 32.

In examples comprising a power converter system, the power system may comprise solar panels coupled to form one or more solar arrays. In an example, the power system may comprise s a plurality of solar panels and/or solar arrays coupled together in a series and/or parallel to facilitate generating a desired current and/or voltage output. Each solar panel may comprise one or more photovoltaic panel(s), a solar thermal collector or any other device that converts solar energy to electrical energy e.g., substantially direct current. The solar panel(s) may be coupled to the power converter.

The power converter may be configured to adjust the amplitude of the voltage and/or current of the converted AC power to an amplitude suitable for the grid. The power converter may be configured to provide AC power at a frequency and a phase that are substantially equal to the grid frequency and phase.

In an example, the power converter may provide three phase AC power. However, the power converter may provide single phase AC power or any other number of phases of AC power.

The wind turbine WT of FIG. 1 may also comprise a control system 100 which may comprise a current control loop 110 and an inter-harmonic damping control unit 120 according to any of the examples disclosed herein. The inter-harmonic damping control unit 120 may be arranged in parallel to the current control loop.

The wind turbine WT according to any of the disclosed examples may be configured to operate in a wind turbine farm.

Figure 1A:
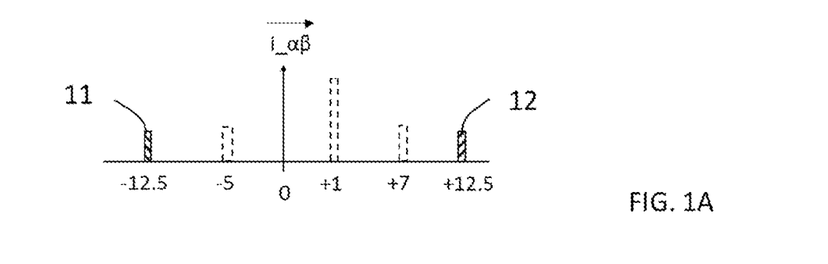
FIG. 1A schematically illustrates the inverse and direct components of an inter-harmonic in stationary and synchronous reference frames, respectively, according to an example.
Figure 1B:
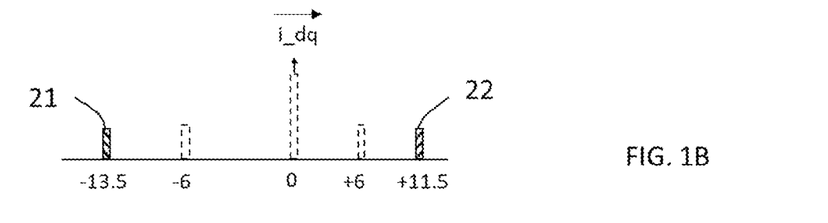
FIG. 1B schematically illustrates the inverse and direct components of an inter-harmonic in stationary and synchronous reference frames, respectively, according to an example.

FIGS. 1A and 1B depict, for a predefined operation point, the inverse component 11, 21 and the direct component 12, 22 of a predetermined inter-harmonic in the stationary frame αβ and in the synchronous frame dq, respectively.

FIG. 1A shows the direct and indirect components 11, 12 of the 12.5 inter-harmonic (or 12.5$^{th}$ inter-harmonic) in the stationary reference frame αβ. The inverse component is located at −12.5 and the direct component at +12.5. In the figure, the components of the inter-harmonic are symmetric to the vertical axis. FIG. 1A also depicts the fundamental frequency located at +1 and two harmonics located at −5 and +7.

FIG. 1B depicts the frequency components of FIG. 1A in the synchronous frame dq. Due to the switch from the stationary reference frame αβ to the synchronous reference frame dq, the components of the inter-harmonic i.e., the order of each component, are shifted along the horizontal axis according to the formula:

$$s = \pm h - 1$$

wherein s is the inter-harmonic order in synchronous reference frame dq and h is the inter-harmonic order in stationary frame αβ to be damped, h=12.5 in this case.

As a result, the direct component +12.5 of FIG. 1A is shifted to 13.5 in FIG. 1B, while the inverse component −12.5 of FIG. 1A is shifted to −11.5 in FIG. 1B. Thus, in the synchronous frame dq the components of 12.5th inter-harmonic, lose the symmetry with respect to the vertical axis of dq reference frame.

Figure 2:
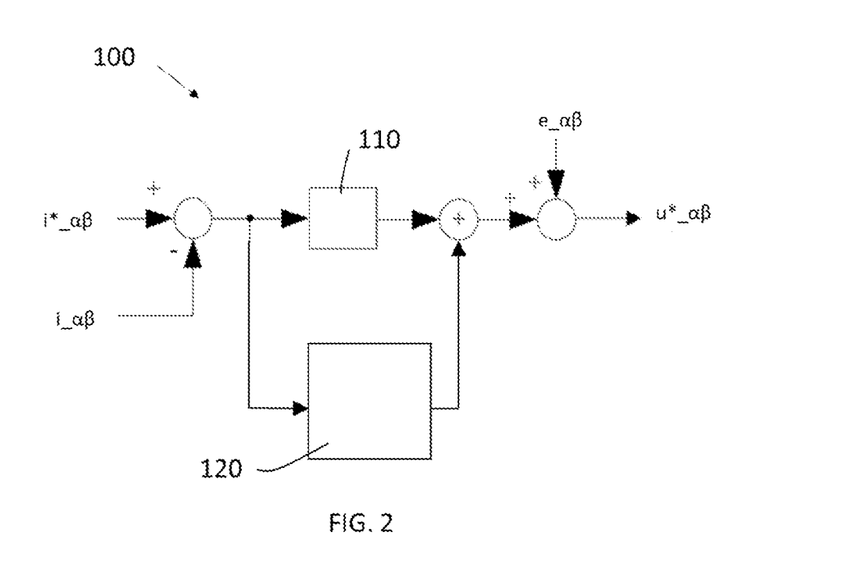
FIG. 2 schematically illustrate a control system in a stationary reference frame according to an example.

FIG. 2 depicts a control system 100 of a wind turbine according to FIG. 1, which may be configured to be coupled to a power consumption system, e.g., an electrical grid. The wind turbine may comprise an electric generator e.g., a Doubly-Fed Induction Generator (DFIG) with a rotor, and a converter (not shown). The rotor may be configured to rotate at different rotation speeds thereby achieving different operation points. Besides, the converter may have a rotor side converter side and a power consumption system side converter e.g., a grid side converter.

The control system 100 may comprise a current control loop structure 110 e.g., a Proportional Integer or Integral (PI), which may be a standard current control loop.

The control loop 110 may receive as input the deviation between the reference current i*_αβ e.g., established by a preceding power control loop (not shown); and the measured current i_αβ, e.g., rotor current. The output of the current loop 110 may be added to a feedforward signal e_αβ, e.g., from a subsequent control loop: in order to obtain the voltage reference u*_αβ which may be used in a Pulse Width Modulation (PWM) e.g., after transforming into triphasic system. In an example, the current control loop may be a proportional integral (PI) control.

The control system 100 may further comprise an inter-harmonic damping control unit 120 arranged in parallel to the control loop 110. The inter-harmonic damping control unit 120 may comprise the input of the current loop i.e., the deviation between the reference current i*_αβ and the measured current i_αβ. Besides, the output of the inter-harmonic damping control unit 120 may be added to the output of the current control loop thereby contributing to calculate the reference voltage u*_αβ.

By arranging the inter-harmonic damping control unit 120 parallel to the current control loop 110, the previous control structure may be kept which enables saving costs and reduces the complexity of adding further elements to a pre-existing control structure.

The inter-harmonic damping control unit 120 may depend on the operation point of the generator of the wind turbine i.e., may depend on the angular speed of the rotor. That is, the inter-harmonic damping control unit 120 may be configured to be adapted to the on-going operating condition e.g., in order to identify and/or determine the value and position of the inter-harmonic(s) of the wind turbine, as explained later on herein (see FIG. 6).

In an example, the inter-harmonic damping control unit 120 may be a resonant controller e.g., SOGI-filter based controller, ROGI-filter based controller or any other suitable resonant controller. Resonant controllers comprise an infinite gain at resonant frequency and may be used as specific filters to damp a predetermined frequency e.g., the direct and/or inverse component(s) of an inter-harmonic.

The ROGI-filter based controllers may affect a single inter-harmonic component, i.e., either direct or inverse component: with a predetermined dynamic. On the other hand, the SOGI-filter based controllers may affect both the direct and the inverse components of a predetermined inter-harmonic with the same dynamic.

Figure 3:
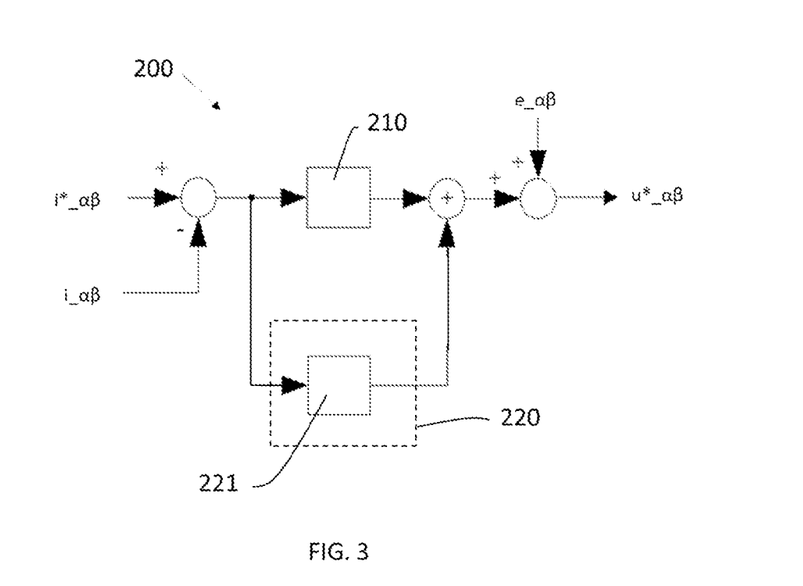
FIG. 3 schematically illustrates a control system in a stationary reference frame according to an example.
Figure 4:
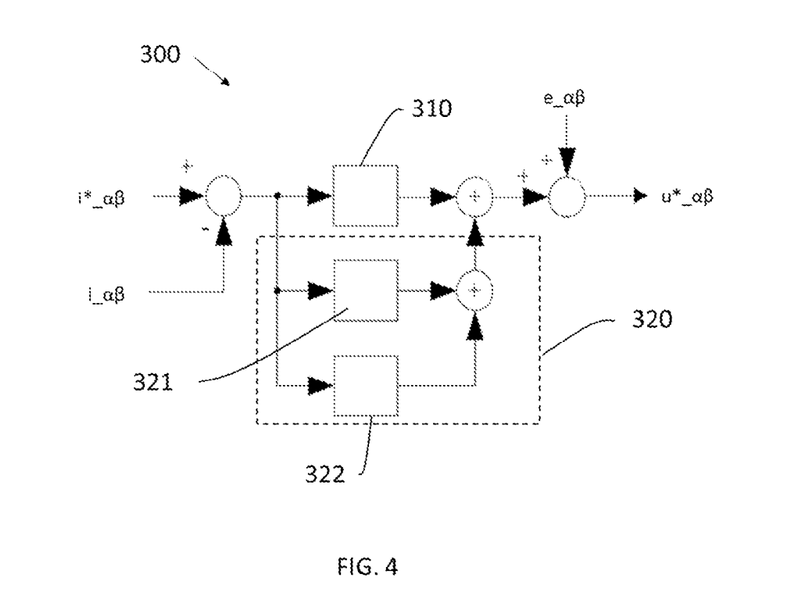
FIG. 4 schematically illustrates a control system in a stationary reference frame according to an example.

The inter-harmonic damping control unit 120 may comprise at least one or a plurality of resonant controllers 121, 221, 222, 321, 322 (see FIGS. 2-4). The resonant controller(s) may be dependent on the operation point of the generator of the wind turbine i.e., may depend on the angular speed of the rotor. In an example, the resonant controllers may be adapted to be dependent on the operational point.

In examples wherein the inter-harmonic damping control unit comprises a plurality of resonant controllers, such resonant controllers may be arranged in parallel with respect to the current control loop and also with respect to each other. The implementation of such inter-harmonic damping control unit is thus simple and enables using a pre-existing control structure which allows saving time and costs. In addition, the possibility of adding more than one module makes the control system versatile and efficient.

In some examples, the inter-harmonic damping control unit may comprise a single resonant controller e.g., a SOGI-filter based controller.

In some examples, the inter-harmonic damping control unit may comprise a plurality of resonant controllers e.g., SOGI-filter based controllers, ROGI-filter based controllers or a combination thereof. The versatility of the control system may thus be enhanced and improved.

The number the resonant controllers may be proportional to the number of inter-harmonics to be damped.

In an example, the number of resonant controllers may be equal to the number of inter-harmonics to be damped. In an alternative example, the number of resonant controllers may be twice the number of inter-harmonics to be damped.

The number and type of resonant controllers may depend on the reference frame, the dynamics to be obtained and/or the number of inter-harmonics to be damped.

FIG. 3 depicts a control system 200 implemented in the stationary reference frame αβ and for a predetermined operation point. The control system 200 may comprise a current control loop 210, e.g., a Proportional Integer (PI), and an inter-harmonic damping control unit comprising a resonant controller 221.

The control system shown in FIG. 3 may be implemented in cases where the wind turbine comprises a single inter-harmonic e.g., the $12.5^{th}$ inter-harmonic having symmetric direct and indirect components +12.5 and −12.5 in stationary reference frame. The resonant controller 221 may be a SOGI-filter based controller which may equally affect the dynamics of both components. Thus, a single controller may be configured to damp both direct and indirect components, e.g., +12.5 and −12.5, respectively, of the inter-harmonic.

The use of a SOGI-filter based controller may therefore enable reducing the number of resonant controllers in the stationary frame αβ. Thus, when implementing a control system in the stationary frame αβ and, in case the inter-harmonic components are to be affected by the same dynamics, the number of resonant controllers may be equal to the number of inter-harmonics to be damped.

FIG. 4 shows a control system 300 implemented in the stationary reference frame αβ. The control system 300 may comprise a current control loop 310, e.g., a Proportional Integer (PI), and an inter-harmonic damping control unit 320 comprising two resonant controllers 321, 322.

The control system shown in FIG. 4 may be implemented, for instance, in cases where the wind turbine comprises two inter-harmonics e.g., 12.5 and 13.5. The resonant controllers 321,322 may be SOGI-filter based controllers. Each SOGI-filter based controller may be configured to damp both components of an inter-harmonic.

In an example, the resonant controller 321 may be configured to damp the components of the $12.5^{th}$ inter-harmonic, i.e. the direct component +12.5 and the indirect component −12.5; while the resonant controller 322 may be configured to damp the direct and the indirect components of $13.5^{th}$ inter-harmonic, i.e. +13.5 and −13.5, respectively.

Additionally, or alternatively, the control system 300 may also be implemented for cases in which the wind turbine comprises a single inter-harmonic, e.g., the $12.5^{th}$ inter-harmonic, but wherein the components of such inter-harmonic are to be affected by different dynamics. In such examples, the resonant controllers 321, 322 may be ROGI-filter based controllers wherein each resonant controller may be configured to handle a single component e.g., either the direct or the inverse component, of the inter-harmonic. In an example, the resonant controller 321 may be configured to damp the direct component of the inter-harmonic and the resonant controller 322 may be configured to damp the indirect component: e.g., +12.5 and −12.5, respectively.

Therefore, and depending on the type of resonant controllers, the control system comprises a high adaptability and/or flexibility to face different situations.

Figure 5:
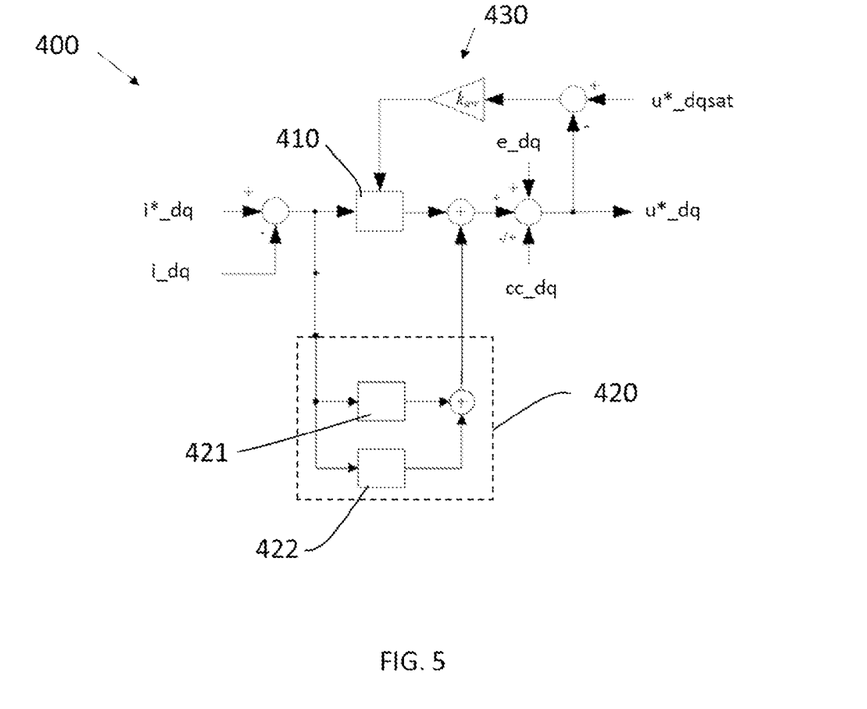
FIG. 5 schematically illustrates a control system in a synchronous reference frame according to an example.

FIG. 5 depicts a control system 400 implemented in the synchronous reference frame dq. The control system 400 may comprise a current control loop 410, e.g., a Proportional Integer (PI), and an inter-harmonic damping control unit 420. In a synchronous reference frame, the control system 400 may further comprise a feedback control loop 430 and a cross-coupling signal cc_dq, as compared to the control structure of the stationary reference frame.

The cross-coupling signal cc_dq e.g., a signal comprising the inter dependency of d and q axis signals, may be a further input signal for calculating the reference voltage u*_dq. Besides, the feedback control loop 430 may have as input the contribution of: the sum of the output of the current control loop and the output of the inter-harmonic damping control, the feedforward signal, the cross-coupling signal cc_dq, and also the maximum voltage u*_dqsat which may be pre-established.

The inter-harmonic damping control unit 420 may be arranged in parallel to the current control loop 410, i.e. it may comprise as input the difference between the reference current i*_dq, e.g. established by a preceding power control loop (not shown); and the measured current i_dq e.g. rotor current; whereas the output of the inter-harmonic damping control unit 420 may be added to the output of the current control loop 410 thereby contributing to calculate the reference voltage u*_dq which may be used (after transforming in triphasic signals) into a PWM.

The inter-harmonic damping control unit 420 may be implemented for example, in cases where the wind turbine comprises a single inter-harmonic, e.g., the $12.5^{th}$ inter-harmonic. However, in synchronous reference frame dq, the components of the inter-harmonic(s) are shifted along the horizontal axis and thus, the components of the inter-harmonic(s) are no longer symmetric with respect to the vertical axis or the fundamental frequency. In the example of the $12.5^{th}$ inter-harmonic, the direct component would be shifted to 13.5 and the indirect component to −14.5.

The resonant controllers 421, 422 may be ROGI controllers wherein each ROGI controller may be configured to damp a component of the inter-harmonic. In an example, resonant controller 421 may be configured to damp the direct component of the inter-harmonic and the resonant controller 422 may be configured to damp the indirect component e.g., +13.5 and −14.5, respectively.

In order to determine the position and damp the inter-harmonic(s) of a wind turbine, the inter-harmonic damping control, and thus the resonant controller(s), may depend on the operational point. To do so, the inter-harmonic damping control, i.e., and the resonant controllers, may be made adaptative.

There may be different ways to make the inter-harmonic damping control unit adaptative. In an example, the inter-harmonic damping control unit may be made adaptative online. In an alternative example, the inter-harmonic damping control unit may be made adaptative offline.

Figure 6:
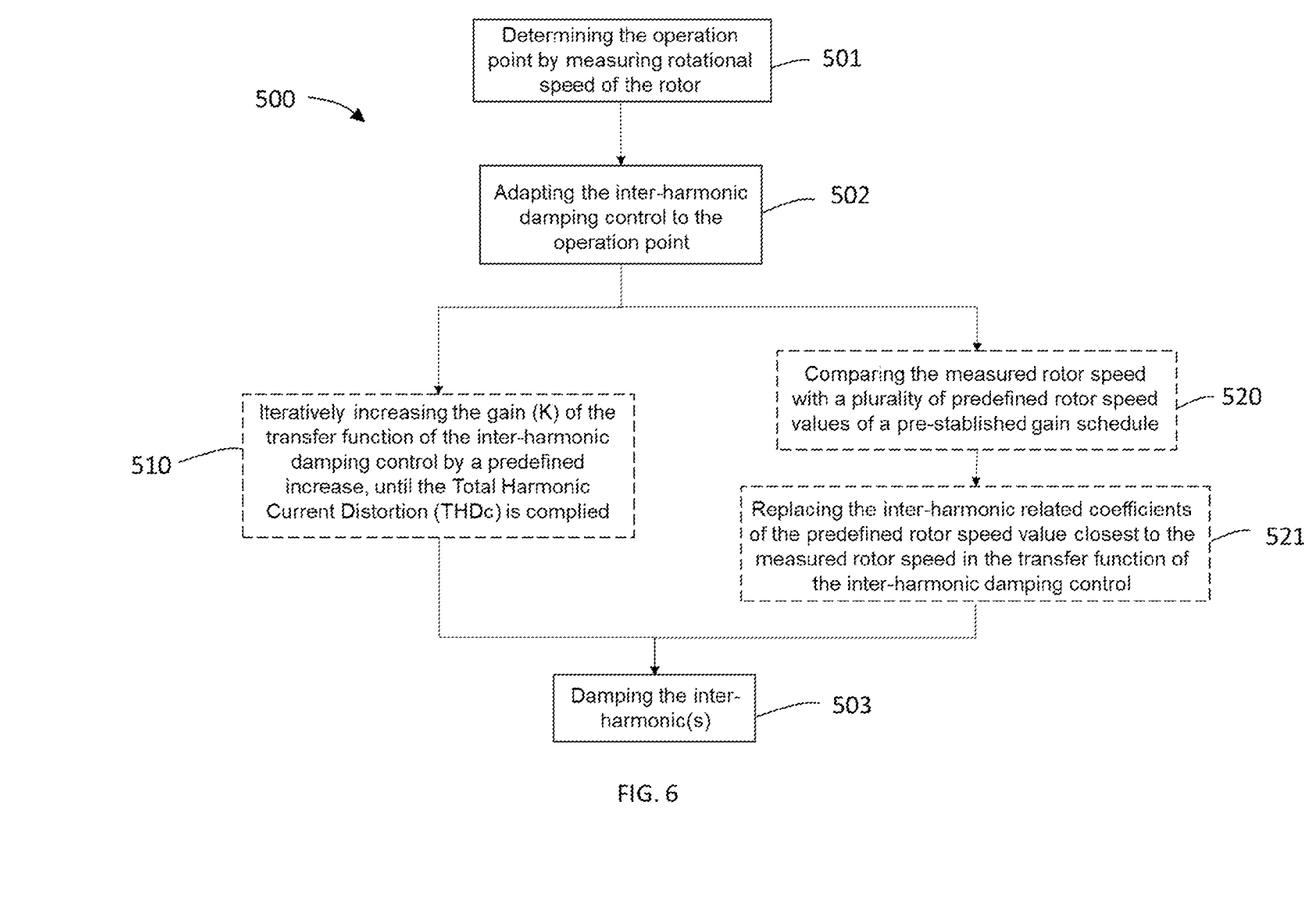
FIG. 6 schematically illustrates a flow diagram of a method for damping inter-harmonics according to an example.

FIG. 6 depicts a method 500 for damping inter-harmonics which could be implemented in a wind turbine comprising a control system according to any of the disclosed examples.

Firstly, the operation point of the wind turbine may, in block 501, be determined. In an example, the operation point may be determined by measuring the rotational speed of the rotor. The rotational speed of the rotor may be measured e.g., by using a sensor, or it may be calculated with e.g., a Phase Locked Loop (PLL) by using a signal from the PLL or any other suitable method.

The inter-harmonic damping control unit may, in block 502, be adapted to the operation point. There may be at least two different options to adapt the inter-harmonic damping control.

In a first example, the gain K of the transfer function of the inter-harmonic damping control unit may be set to be a minimum value (Kmin), e.g., 0.01 or any other suitable value.

The (minimum) gain may be progressively and/or iteratively increased by a predefined increase ($\Delta h$), e.g., 0.0001, until the Total Harmonic Current Distortion (THDc) is complied. THDc relates to the maximum allowed harmonic level and may be part of grid requirements set by each grid operator and thus, the method enables complying with the grid code requirements of each country/region. Such predefined increase ($\Delta h$) may be equal to or dependent on the discretization of a speed range e.g., the operational speed range of the wind turbine.

The speed range may be discretised in sub-ranges of predetermined length, e.g., 0.0001, in order to have a finite number of speed sub-ranges. Such predetermined length may equal to the predefined increase ($\Delta h$) and may be dependent on the grid. As a result, the discretized sub-ranges may be dependent on the slip, and thus, of the measured rotational speed of the rotor.

Upon compliance of the THDc, the gain may be set to the last obtained value. The inter-harmonic damping control may therefore be adapted.

In an alternative example, adapting the inter-harmonic damping control unit may firstly comprise comparing, in block 520, the measured rotor speed with a plurality of rotor speed values of a pre-stablished gain schedule, i.e., a lookup table.

The pre-stablished gain schedule may comprise a predefined plurality of rotor speed value ranges ($\omega_1$ to $\omega_2$, $\omega_2$ to $\omega_3$, $\omega_3$ to $\omega_4$; and $\omega_4$ to $\omega_5$) e.g., a plurality of rotor speed values that may be equal to or above a lower limit, and may be below an upper limit. Each of the predefined plurality of rotor speed value ranges may have associated inter-harmonic related coefficients. The associated inter-harmonic related coefficients may be an inter-harmonic order h and a gain K.

An example of a pre-stablished gain schedule is provided in the following table:

| Range | Rotational speed of the rotor | Gain | Inter-harmonic order |
|---|---|---|---|
| 1 | [$\omega_1$ to $\omega_2$) | $K_1$ | $h_1$ |
| 2 | [$\omega_2$ to $\omega_3$) | $K_2$ | $h_2$ |
| 3 | [$\omega_3$ to $\omega_4$) | $K_3$ | $h_3$ |
| 4 | [$\omega_4$ to $\omega_5$) | $K_4$ | $h_4$ |

The gain of pre-stablished gain schedule may be previously calculated in accordance with a control system stability criterion, e.g., regarding a minimum positive damping.

The inter-harmonic order h associated to each of the predefined plurality of rotor speed values may be previously calculated e.g., by dividing the inter-harmonic frequency fSH by the fundamental frequency f0, wherein the inter-harmonic frequency fSH is:

$$f_{SH} = 6n \cdot (1-s) \cdot f_0 \pm f_0$$

The predefined rotor speed value ranges within which the measured rotor speed falls may then be selected. Afterwards, the inter-harmonic related coefficients of such predefined rotor speed value range may, in block 521, be replaced in the transfer function of the inter-harmonic damping control unit thereby adapting the inter-harmonic control.

In an example, the values of the inter-harmonic related coefficients, e.g., gain K and inter-harmonic order h, of pre-stablished gain schedule may vary depending on the reference frame.

That is, for the stationary reference frame $\alpha\beta$ and the synchronous reference frame dq different pre-stablished gain schedules may be used.

The process may be repeated for each operational point, i.e., upon measuring a rotor speed different from the on-going one. Thus, the resonant controller may be adapted for each operational point.

Finally, the inter-harmonic(s) of the wind turbine may, in block 503, be damped by the inter-harmonic damping control 120, 220, 320, 420.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
an electric generator having a rotor, the rotor being configured to rotate at different rotation speeds thereby operating at different operation points,
a converter having a rotor side converter and a power consumption system side converter; and
a control system including,
a current control loop having a current control loop error input and a current control loop output,
an inter-harmonic damping control unit having as input the current control loop error input and an inter-harmonic damping control unit output, the inter-harmonic damping control unit having at least a resonant controller which is dependent on the operation point of the generator, and an adder configured to sum at least two input signals, wherein the adder is connected to the output of the current control loop and to the output inter-harmonic damping control unit thereby providing an inter-harmonic damping signal.

2. The wind turbine according to claim 1, wherein the inter-harmonic damping control unit is arranged in parallel to the current control loop.

3. The wind turbine according to claim 2, wherein the at least one resonant controller is implemented at the power consumption system side converter, or, at rotor side converter.

4. The wind turbine according to claim 2, wherein the inter-harmonic damping control unit comprises at least a resonant controller implemented at the side of the power consumption system side converter and at least a resonant controller implemented at the rotor side converter.

5. The wind turbine according to claim 1, wherein the inter-harmonic damping control unit comprises a plurality of resonant controllers arranged in parallel.

6. The wind turbine according to claim 5, wherein the number of resonant controllers depends on the reference frame, wherein the reference frame is an abstract coordinate system either a stationary frame ($\alpha\beta$) or synchronous reference frame (dq).

7. The wind turbine according to claim 5, wherein the number of resonant controllers is equal to the number of inter-harmonics to be damped.

8. The wind turbine according to claim 5, wherein the number of resonant controllers is twice the number of inter-harmonics to be damped.

9. The wind turbine according to claim 5, wherein the plurality of resonant controllers are Reduced Order Generalized Integrator-filter based controllers, SOGI-filter based controllers or a combination thereof.

10. The wind turbine according to claim 1, wherein the at least one resonant controller is a Second Order Generalized Integrator-filter based controller.

11. The wind turbine according to claim 1, wherein the electric generator is a Doubly-Fed Induction Generator.

12. A method for damping the inter-harmonic(s) of a wind turbine according to claim 1, the method comprising:
   determining the operation point of the wind turbine by measuring the rotational speed of the rotor;
adapting the inter-harmonic damping control unit to the operation point by making at least one resonant controller of an inter-harmonic damping control unit dependent on the rotor speed; and
damping the inter-harmonics of the wind turbine through the inter-harmonic damping control unit.

13. The method according to claim 12, wherein adapting the inter-harmonic damping control unit comprises:
   iteratively increasing the gain of the transfer function of the inter-harmonic damping control unit, starting from a minimum gain and by adding a predefined increase (Ah), until the Total Harmonic Current Distortion is complied.

14. The method according to claim 12, wherein adapting the inter-harmonic damping control unit comprises:
   comparing the measured rotor speed with a plurality of predefined rotor speed value ranges of a pre-stablished gain schedule, wherein each predefined rotor speed value range comprises associated inter-harmonic related coefficients; and
replacing the inter-harmonic related coefficients of the predefined rotor speed value range within which the measured rotor speed falls in the transfer function of the inter-harmonic damping control.

* * * * *